Aug. 23, 1927.

J. L. VALLIERE 1,640,102

FREIGHT HOOK

Filed Sept. 10, 1926

Inventor:
John L. Valliere,
by E. M. Bond
Atty.

Patented Aug. 23, 1927.

1,640,102

UNITED STATES PATENT OFFICE.

JOHN L. VALLIERE, OF SKOWHEGAN, MAINE.

FREIGHT HOOK.

Application filed September 10, 1926. Serial No. 134,667.

This invention relates to certain new and useful improvements in freight hooks, and it has for its objects, among others, to provide a simple and cheap, yet durable and efficient freight hook well adapted for all the purposes for which it may be used, and in which the handle portion is so constructed and related to the other parts that it may be readily turned so as to fold to a position at right angles to its operative position, so that the hook in its folded condition can be carried in the pocket, being flat and smooth.

The mechanism whereby the handle is made to fold is concealed where it is not liable to become caught in any object, being fully protected and not liable to get out of order, or fail to work when it is desired to fold the same.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which Figure 1 is a side elevation of the hook in position for use.

Like numerals of reference indicate like parts throughout the several views.

Referring to the drawings—

1 designates the shank of suitable material, preferably metal, bifurcated at one end as seen at 2, to receive the shank 3 of the hook 4.

Figure 3:
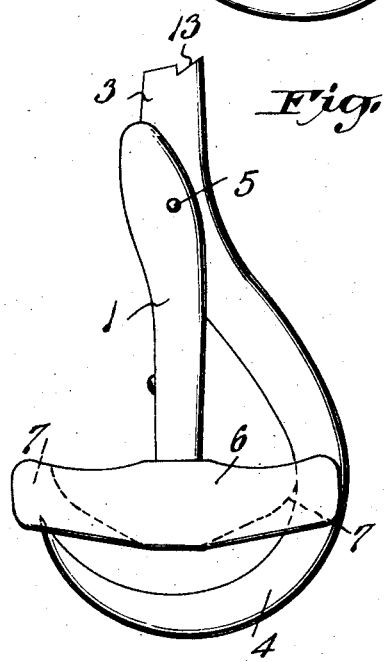
Figure 3 is a view with the parts in their folded condition.

The shank 3 of the hook is pivoted between the sides of the bifurcation 2 upon a suitable pivot 5 so that the parts may be moved upon such pivot to fold the implement, the one part upon the other as seen in Figure 3.

6 is the handle; its ends are recessed as seen at 7 so that when folded the hook may be received within such recesses as seen in Figure 3 and the parts thus made into a small compact form convenient to carry in the pocket.

Figure 2:
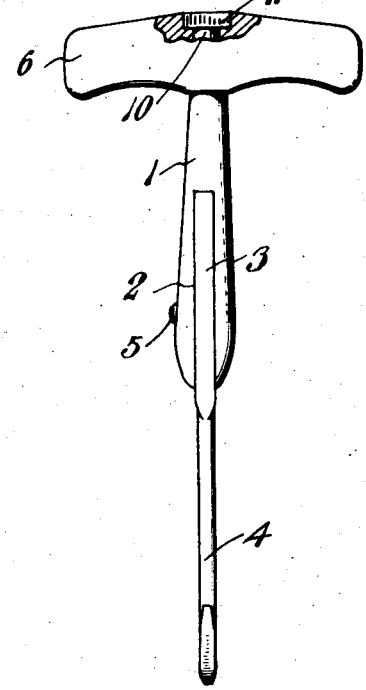
Figure 2 is a view at right angles to Figure 1.

In operative position the handle stands in a position at right angles to the hook as seen in Figure 2, but when the parts are folded the handle 6 is turned into a position at right angles to that which it assumes in use, and in such position is seen in Fig. 3.

Figure 4:
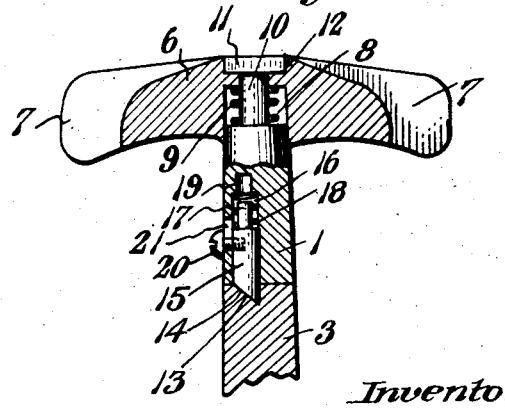
Figure 4 is an enlarged detail, partly in section, with portions broken away, showing the means for locking the handle in position.

In order that the handle 6 may thus turn and still be held rigid in its operative position the handle is made with the bore 8 in which is disposed a spring 9 around a stud 10 on the shank 1, as seen in Figure 4 on the outer end of which stud is a nut 11 as seen in Figure 4, the nut being received in a recess 12 in the end of the shank-handle as seen in Figures 2 and 4.

The end of the shank 3 is provided with a notch 13 as seen in Figures 3 and 4 into which is received the beveled end 14 of a bolt 15 slidable in a passage 16 in the adjacent end of the shank 1 as seen in Figure 4, the bolt having a portion 17 around which is disposed a spring 18, the end of the portion 17 adapted to engage in a hole 19 in the shank 1 and the bolt provided with a screw or the like 20 working in a slot 21 in the shank 1, all as clearly seen in Figure 4.

Figure 1:
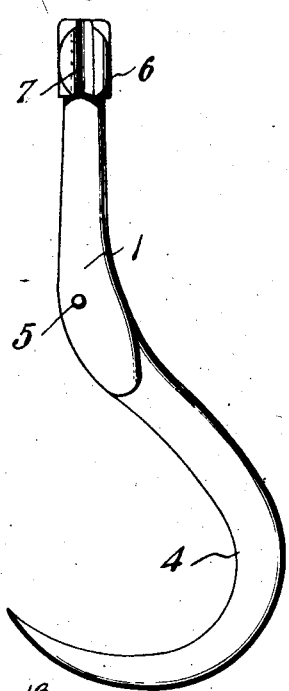

Normally, that is when the hook is ready for use, the parts are in the position shown in Figures 1, 2 and 4, the handle 6 being extended at right angles to the plane of the hook 4. When not in use the handle 6 is pushed inward sufficiently to cause the nut 11 to move out of its recess when the handle 6 may be turned at right angles to its former position, the bolt is moved to free it of engagement in the notch 13 and then the hook member is turned so as to bring it into its closed position, that seen in Figure 3, when the point of the hook and the curve of the said hook are received in the recesses or bifurcations 7 of the handle, when the device may be safely carried in the pocket. When the parts are returned to operative position the bolt springs into place as does the handle 6 and all the parts are locked against accidental disengagement.

Modifications in detail may be resorted to without departing from the spirit of the invention or sacrificing any of its advantages.

What is claimed as new is:—

1. A freight hook having a shank and a hook portion pivotally mounted thereon, and a handle portion on the shank having recesses to receive the hook portion when folded.

2. A freight hook comprising a shank, a hook portion pivoted thereon, a handle portion turnably mounted on the end of the shank, and means permitting movement of the handle on the shank to allow it to be turned into a position opposite to its normal position, both shanks being extended in longitudinal alignment in both of said positions.

3. A freight hook embodying a shank with a hook, and a shank pivotally mounted on the shank of said hook and provided with a handle, the pivot of the handle shank being located adjacent the end of the first-named shank and the hook shank movable to bring the shank of the handle into position substantially parallel with the shank of the hook in both the open and closed positions of the hook.

4. A freight hook embodying a shank with a hook, and a shank pivotally mounted on the shank of said hook and provided with a handle, the pivot of the handle shank being located adjacent the end of the first-named shank and the hook shank movable to bring the shank of the handle into position substantially parallel with the shank of the hook in both the open and closed positions of the hook, the two shanks having interlocking means.

In testimony whereof I affix my signature.

JOHN L. VALLIERE.